(12) United States Patent
Lee et al.

(10) Patent No.: US 8,760,525 B2
(45) Date of Patent: Jun. 24, 2014

(54) IMAGE CAPTURING DEVICE AND IMAGE CAPTURING METHOD THEREOF

(75) Inventors: I-Hsien Lee, Hsinchu (TW); Chia-Ho Pan, Tainan (TW); Shuei-Lin Chen, Kaohsiung (TW)

(73) Assignee: Altek Corporation, Hsinchu (TW)

( * ) Notice: Subject to any disclaimer, the term of this patent is extended or adjusted under 35 U.S.C. 154(b) by 234 days.

(21) Appl. No.: 13/183,056

(22) Filed: Jul. 14, 2011

(65) Prior Publication Data
US 2012/0169893 A1 Jul. 5, 2012

(30) Foreign Application Priority Data
Dec. 31, 2010 (TW) ................................ 99147422 A

(51) Int. Cl.
*H04N 5/228* (2006.01)
(52) U.S. Cl.
USPC .................................... 348/208.1; 348/208.4
(58) Field of Classification Search
USPC .......................................... 348/208.1–208.99
See application file for complete search history.

(56) References Cited

U.S. PATENT DOCUMENTS

| 2005/0057670 | A1* | 3/2005 | Tull et al. ....................... 348/241 |
| 2006/0109754 | A1* | 5/2006 | Iijima ......................... 369/30.01 |
| 2009/0195505 | A1* | 8/2009 | Chen et al. ..................... 345/166 |

FOREIGN PATENT DOCUMENTS

EP 1779322 * 9/2008 ................ G06T 5/00

* cited by examiner

*Primary Examiner* — Roberto Velez
*Assistant Examiner* — Stephen Coleman
(74) *Attorney, Agent, or Firm* — Wang Law Firm, Inc.; Li K. Wang; Stephen Hsu

(57) ABSTRACT

An image capturing device and an image capturing method thereof are disclosed. The image capturing device includes an image capturing module and a processing module. The image capturing module captures a plurality of temporary images corresponding to a scene. The processing module sequentially analyzes the temporary images and generates a plurality of analysis results. The processing module dynamically adjusts the sampling time of the image capturing module capturing each temporary image according to the analysis results. Moreover, the processing module selects some of the plurality of temporary images according to the analysis results to integrate images. The image capturing module stops capturing the temporary images based upon a stop signal, and finally a storage image is generated.

15 Claims, 7 Drawing Sheets

IMAGE CAPTURING DEVICE AND IMAGE CAPTURING METHOD THEREOF

BACKGROUND OF THE INVENTION

1. Field of the Invention

The exemplary embodiment(s) of the present invention relates to an image capturing device and a control method thereof. More specifically, the exemplary embodiment(s) of the present invention relates to an image capturing device and an image capturing method thereof which increases image quality.

2. Description of the Related Art

In order to prevent the poor quality of image caused by camera shake while capturing, the manner of integrating multiple sampling images is applied in the digital camera for improvement of image quality. In the manner, shutter time must be shortened for a desired scene to capture a series of images, and a reference image is thereby selected among them. With respect to other captured images and the selected reference image, geometric moving measurement is executed to get a geometric conversion parameter between each of the images and the reference image. According to the given conversion parameter, each image is converted to make each image combine the selected reference image by point to point. Then, with some composition techniques, relevant image points distributed over all images are composited into a combined image which may be clearer than the original images.

With the principle of image capturing device, when the shutter time is decreased, the time of the camera shake or object moving in a particular scene is shorter than long time sampling, so that the resulted motion blur effect may be reduced. In the implementation, upon the initial detection result of exposure time, the exposure time is divided into multiple equal and smaller image sampling times, and a light sensor device captures multiple high frequently sampling images based upon its assigned image sampling time. Therefore, all of the high frequently sampling images have same light intensity, and the total image sampling time is equal to the preset exposure time of the image capturing device. In that manner, the exposure time of each processed frame is smaller than that of a correct exposure frame, and the accuracy estimated for motion information and the capability of motion blur compensation are improved.

However, in the motion frame, despite smaller sampling time that may reduce the motion measurement error, each of the high frequently sampling images is not analyzed for its effectiveness. When the blur caused by the motion frames is eliminated by the high sampling frequency, a pixel quantization error happens to the frame owing to the high sampling frequency, which does not make the image capturing device effectively increase the output image quality. Such a pixel quantization error is obviously more serious especially when the sampling frequency rises. With the repeated sampling and in consideration of sampling time shortening and the caused quantization error, the image quality improvement is a key.

Besides, the initial exposure time setting also limits the effect of composition of the high sampling frequency image to some extent. Thus, for the demand, designing an image capturing device and its image capturing method thereof to increases image quality has become an urgent issue for the market application.

SUMMARY OF THE INVENTION

An image capturing device and image capturing method thereof according to this invention is provided to solve the mentioned-above defects and poor overlay effect of prior art of a current image capturing device that always processes multiple images for a long time.

The image capturing device according to this invention comprises an image capturing module and a processing module. The image capturing module captures a plurality of temporary images corresponding to a scene. The processing module sequentially analyzes the temporary images to correspondingly generate a plurality of analysis results. The processing module dynamically adjusts the sampling time of each temporary image captured by the image capturing module according to each of the analysis results. The processing module selects some of the plurality of temporary images according to the analysis result, integrates the selected temporary images, and stops capturing the temporary images according to a stop signal to generate a storage image.

In this invention, an image capturing method is further provided, comprising the following steps: using an image capturing module to capture a plurality of temporary images corresponding to a scene; sequentially analyzing each of the temporary images by a processing module to correspondingly generate a plurality of analysis results; according to each of the analysis results, using the processing module to dynamically adjust the sampling time of each of the temporary images captured by the image capturing module; and using the processing module to select some of the plurality of temporary images according to the analysis results, to integrate the selected temporary images, and to stop capturing the temporary images based upon a stop signal to generate a storage image.

Herein, the processing module preferably controls an image analysis module to analyze a motion blur or sampling quantization error of each of the temporary images for correspondingly generating the analysis results.

Herein, the processing module preferably further determines the sampling time, determines whether the temporary image is used for image overlay, or determines the weight of temporary image used for image overlay according to the analysis result.

Herein, an exposure module is further included to meter the light of scene to generate an exposure time. According to the exposure time, the processing module determines the sampling time of a first temporary image of the plurality of temporary images.

Herein, when the total sampling time in which the processing module integrates the plurality of temporary images is larger than or equal to the exposure time, the processing module generates the stop signal.

Herein, when the image quality of a temporary integrated image generated when the processing module integrates the plurality of temporary images exceeds a preset value, the processing module generates the stop signal.

Herein, when receiving a trigger signal, the processing module generates the stop signal.

Herein, the processing module controls all pixels of the same image object in the temporary images integrated by an image integration module to generate the storage image.

In this invention, an image capturing device is further provided, comprising: means for capturing a plurality of temporary images corresponding to a scene; and means for sequentially analyzing the temporary images to correspondingly generate a plurality of analysis results; means for dynamically adjusting the sampling time of each temporary image captured by the image capturing module according to each of the analysis results; means for selecting some of the plurality of temporary images according to the analysis results, and integrating the selected temporary images; and means for stopping capturing the temporary images based upon a stop signal to generate a storage image.

To sum up, in this invention, the image capturing device and the image capturing method thereof has one or more advantages, as follows:

1. During capturing, with the image capturing device and the image capturing method thereof, according to the analysis result made by an analysis module on multiple temporary images, adequate temporary images may be selected and unnecessary temporary images may be removed to determine required temporary images for image overlay. From the temporary images, some information is removed owing to the result of analysis made by the analysis module, so the sampling stop time, when the plurality of temporary images are sampled, depends on the original exposure time which the total light quantity integrating the plurality of temporary images is larger than or equal to. The total sampling time is not limited to a total exposure time that is preset.
2. During capturing, with the image capturing device and the image capturing method thereof, the sampling time of a next temporary image may be determined by the analysis module according to the current temporary image quality and corresponding sampling time length thereof. With such a design, the sampling time may be determined according to the motion degree of a camera or object to prevent the high frequently sampling images from serious pixel quantization, and the low frequently sampling image from serious motion blur.

BRIEF DESCRIPTION OF THE DRAWINGS

The exemplary embodiment(s) of the present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE PREFERRED EMBODIMENTS

Now, the present invention will be described more specifically with reference to the following embodiments. It is to be noted that the following descriptions of preferred embodiments of this invention are presented herein for purpose of illustration and description only; it is not intended to be exhaustive or to be limited to the precise form disclosed.

The image capturing device according to this invention may be a digital camera, a camera phone, a Smartphone, or a digital video camera and the like as a portable electronic device having an image pickup function. In order to further know the features and technical means of this invention, refer to the following embodiments illustrating the camera phone, not remaining within the confines of what is required herein.

Figure 1:
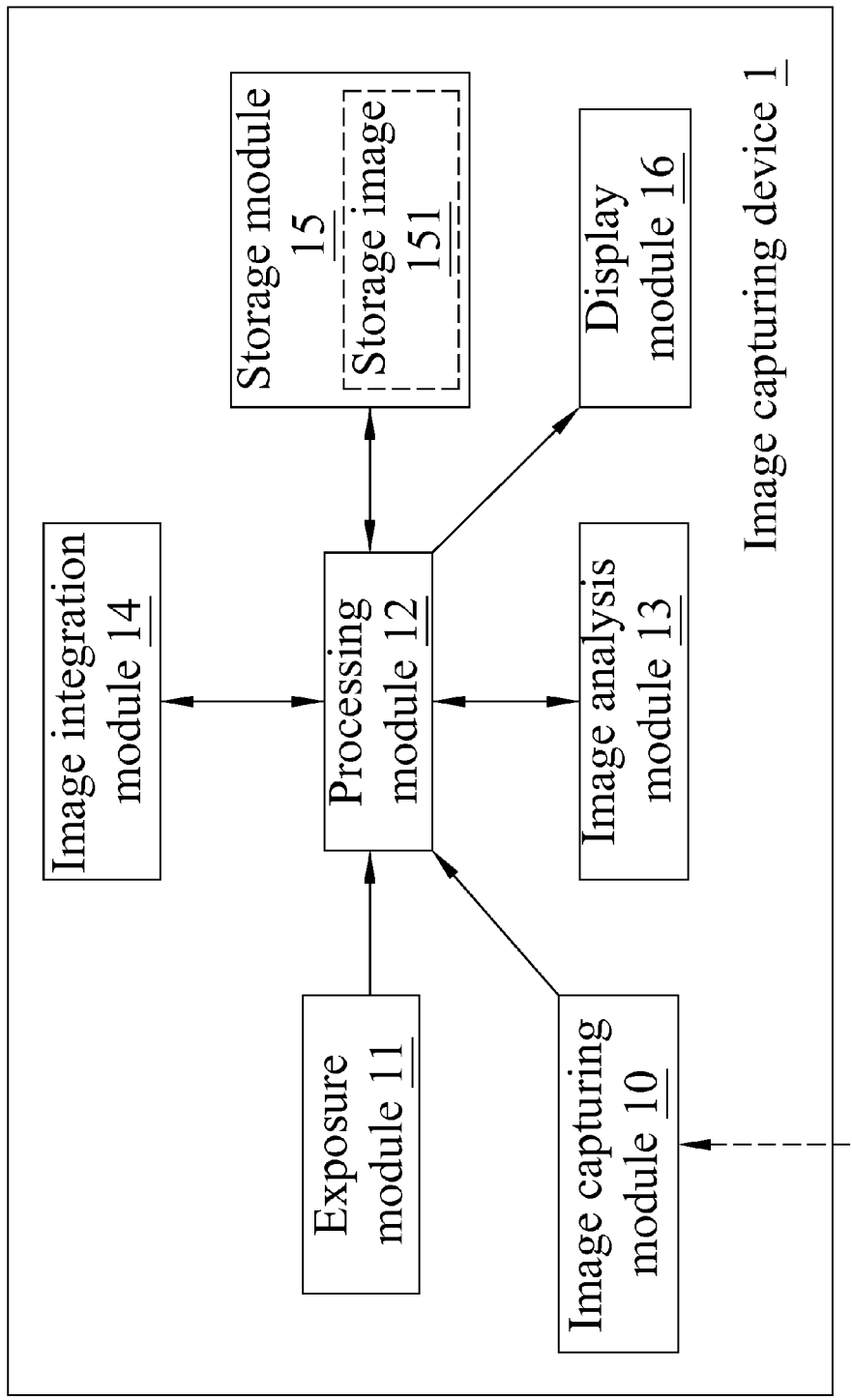
FIG. 1 is a block diagram in an embodiment of an image capturing device according to this invention.

Refer to FIG. 1 as a block diagram in an embodiment of an image capturing device according to this invention. As shown in the figure, the image capturing device 1 according to this invention comprises an image capturing module 10, an exposure module 11, a processing module 12, an image analysis module 13, an image integration module 14, a storage module 15, and a display module 16. The image capturing module 10 may be used to capture an image corresponding to a scene and generate image data. The image capturing module 10 may comprise a lens a Complementary Metal-Oxide-Semiconductor (CMOS) or a Charge-Coupled-Device (CCD), an analog/digital circuit, an image processor and the like. The exposure module 11 is provided with an auto adjustment mechanism of exposure, which may comprise aperture, shutter, ISO sensibility and the like, which meters the light of shot scene for generating an initial exposure time. The storage module 15 may work for image storage and may be an embedded memory, an external memory card or their combination. The display module 16 is used to show an image and may be a Liquid Crystal Display (LCD) or a touch-controlled LCD.

The processing module 12 is electrically connected to the image capturing module 10, the exposure module 11, the image analysis module 13, the image integration module 14, the storage module 15, and the display module 16, and may be a central processing unit (CPU) or a micro-processing unit. The processing module 12 may control the image capturing module 10 to capture a first temporary image 101 according to an initial exposure time given by the exposure module 11. The image analysis module 13 may immediately analyze the motion blur and sampling quantization error of the first temporary image 101 to correspondingly generate an analysis result. The analysis result may be a weight of measurement of a motion blur, sampling quantization error or their combination. Besides, the processing module 12 may dynamically adjust the sampling time of the image capturing module 10 for capturing a second temporary image 101 according to the analysis result. The image analysis module 13 may further compare the motion blur and sampling quantization error of second temporary and the given motion measurement error of first and second temporary images 101, with actual error to correspondingly generate another analysis result.

Namely, the processing module 12 may control the image capturing module 10 to capture a plurality of temporary images 101 and sequentially analyze each of the temporary images 101 to correspondingly generate each result of analysis on each of the temporary images 101. Each of the analysis result may be a weight measurement value, in which the given value is an error given after the motion measurement error of motion blur, sampling quantization error of each of the temporary images 101 with the actual conditions, or their combination. The processing module 12 may dynamically adjust the sampling time of the image capturing module 10 for capturing each of the temporary images 101 according to each of the analysis results. Next, according to each of the weight measurement values, the processing module 12 may further select some of the temporary images 101 and may control the image integration module 14 to integrate the images for each pixel in the same image object. Alternatively, the processing module 12 may control the image integration module 14 to integrate the images according to the weight measurement values corresponding respectively to the temporary images 101. Namely, the processing module 12 may multiply each of the temporary images 101 by each of the weight measurement values, or may multiply each of the temporary images 101 by different specific weight according to the weight measurement value of each of the temporary images 101 for achievement of the image overlay.

It is remarkable that the processing module 12 may control each module to continue the image capturing and image overlay described above and does not stop capturing the temporary images until it receives a stop signal. The stop signal may be generated when the following conditions exist. For example, when the total sampling time in which the processing module 12 integrates the plurality of temporary images 101 is larger than or equal to the initial exposure time given by the exposure module 11, the processing module 12 generates the stop signal. Alternatively, when the image quality of a temporary integrated image generated when the processing module 12 integrates the plurality of temporary images 101 exceeds a preset value, the processing module 12 generates the stop signal. Further, alternatively, when receiving a trigger signal generated when a user loosens an image capturing button, the processing module 12 generates the stop signal.

Next, the processing module 12 may control the image integration module 14 to finish the overlay of temporary images 101, a storage image 151 being thereby generated and stored in the storage module 15. The processing module 12 may control the display module 16 for showing the storage image 151. By the way, it is apparent to those who are skilled in the art that the embodiments describing the way of stop signal generation are only examples without limit to this invention. Besides, all those skilled in the art may randomly combine the functional modules into an integrated module or divide them into each detailed functional unit, depending on the convenience of design.

Besides, all those skilled in the art may randomly combine the functional modules into an integrated means or divide them into each detailed functional means, depending on the convenience of design.

Figure 2:
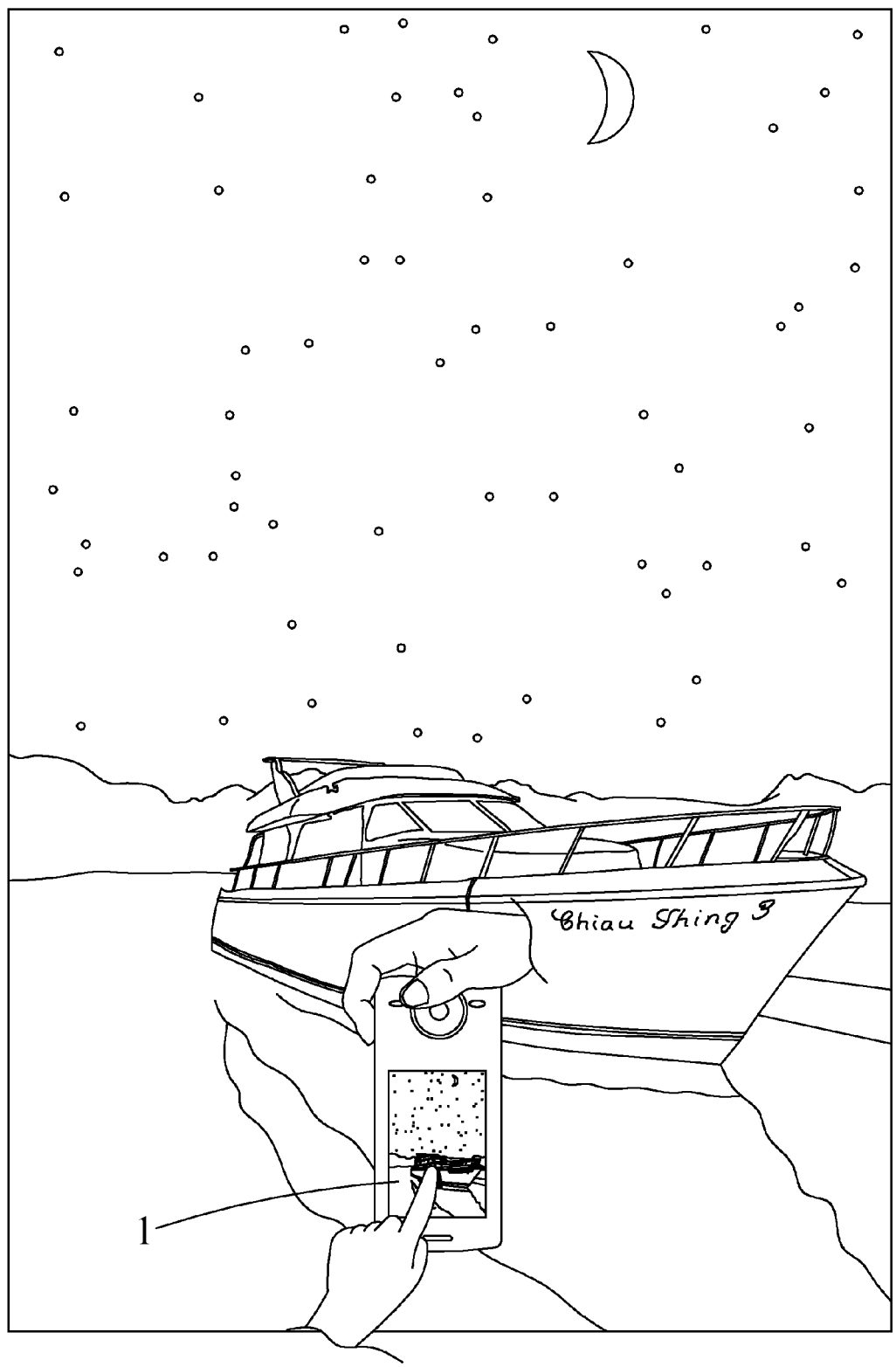
FIG. 2 is a schematic view illustrating an embodiment of the image capturing device according to this invention.

Refer to FIG. 2 as a schematic view illustrating an embodiment of the image capturing device according to this invention. As shown in the figure, before integrating the image pickup for multiple images to increase the quality of a final storage image, the user may evaluate the operation condition in the image capturing presetting process, generally named S1 process. An exposure module 11 is used to meter the light of scene for generating an initial exposure time. When the image capturing device 1 enters an actual image capturing process, generally named S2 process, at the beginning, the processing module 12 may set up the sampling time of first temporary image 101 according to the initial exposure time adjusted in the 51 process. In the embodiment, the initial exposure time generated by the exposure module 11 may be 1 second. The processing module 12 may set up the sampling time of a ½ second of first temporary image 101 according to 1 second of initial exposure time. After capturing of the first temporary image 101, the image analysis module 13 may immediately analyze the first temporary image 101 on the motion blur and sampling quantization error to correspondingly generate a first weight measurement value for motion blur, sampling quantization error, or their combination.

Besides, the processing module 12 may dynamically adjust the sampling time of second temporary image 101 captured by the image capturing module 10 according to the first weight measurement value analyzed by the image analysis module 13. In the embodiment, when the user continues capturing a second temporary image 101, if the first weight measurement value of the first captured temporary image 101 does not meet a predetermined standard, namely the fact that the motion blur and sampling measurement error of the first temporary 101 is not in a predetermined range acceptable, it is indicated that the user operates in the current stability lower than the predetermined condition. Here, the processing module 12 may reduce the sampling time in which the image capturing module 10 captures the second temporary image 101. For example, the time is reduced from ½ second to ¼ second. After capturing of the second temporary image 101, the image analysis module 13 may further analyze the second temporary image 101 on the motion blur and sampling quantization error, or the error or combination given after the first and second temporary images 101 is measured for motion measurement error for comparison with the actual condition to correspondingly generate a second weight measurement value.

When the user continues capturing a third temporary image 101, if the second weight measurement value of the second captured temporary image 101 meets a predetermined standard, namely the fact that the motion blur and sampling measurement error of the second temporary 101 is in a predetermined range acceptable, it is indicated that the user operates in the current stability higher than the predetermined condition. Here, the processing module 12 may lengthen the sampling time in which the image capturing module 10 captures the third temporary image 101. For example, the time is lengthened from ¼ second to ⅓ second. After capturing of the third temporary image 101, the image analysis module 13 may further analyze the third temporary image 101 on the motion blur and sampling quantization error, or the error or combination given after the second and third temporary images 101 is measured for motion measurement error for comparison with the actual condition to correspondingly generate a third weight measurement value. Namely, the processing module 12 may dynamically adjust sequentially the sampling time of the image capturing module 10 for capturing each of the temporary images 101 according to each of the weight measurement values.

Figure 3A:
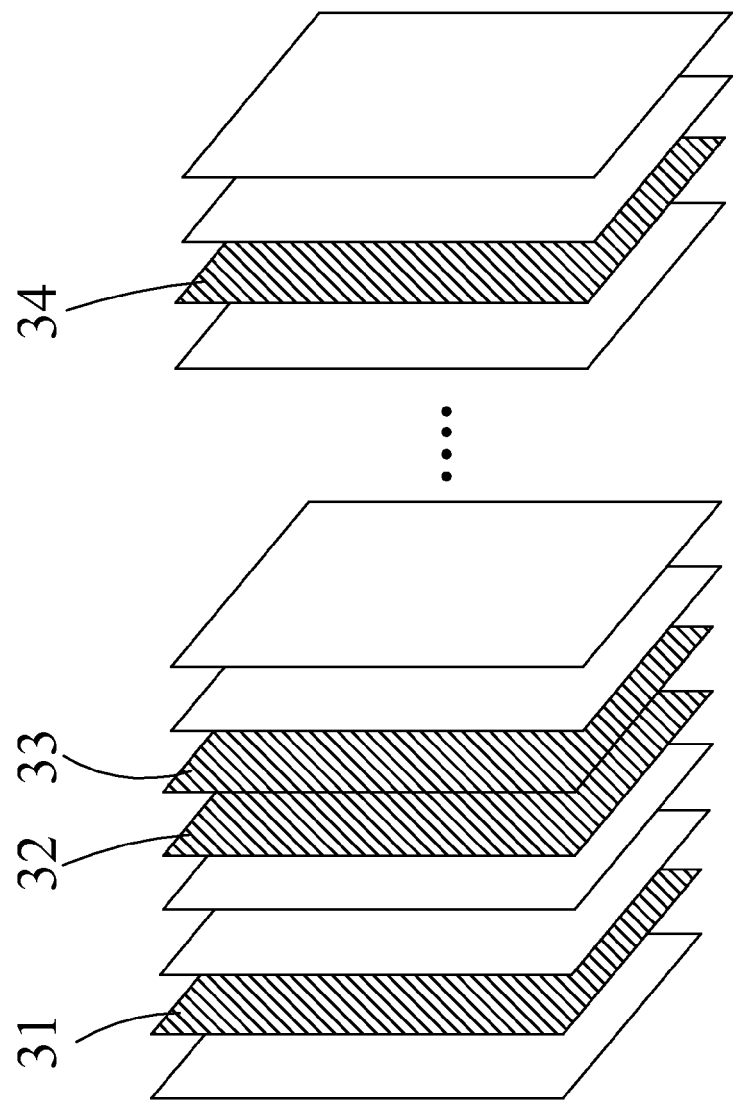
FIG. 3A is a first schematic view of grouping temporary images in an embodiment of an image capturing device according to this invention.
Figure 3B:
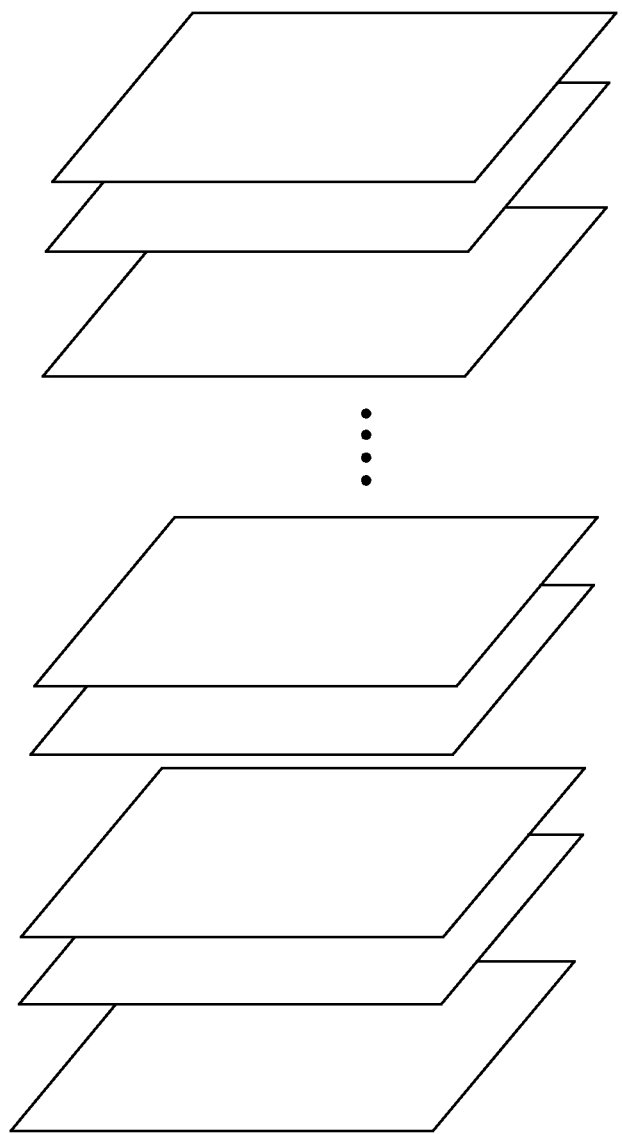
FIG. 3B is a second schematic view of grouping the temporary images in an embodiment of an image capturing device according to this invention.
Figure 4:
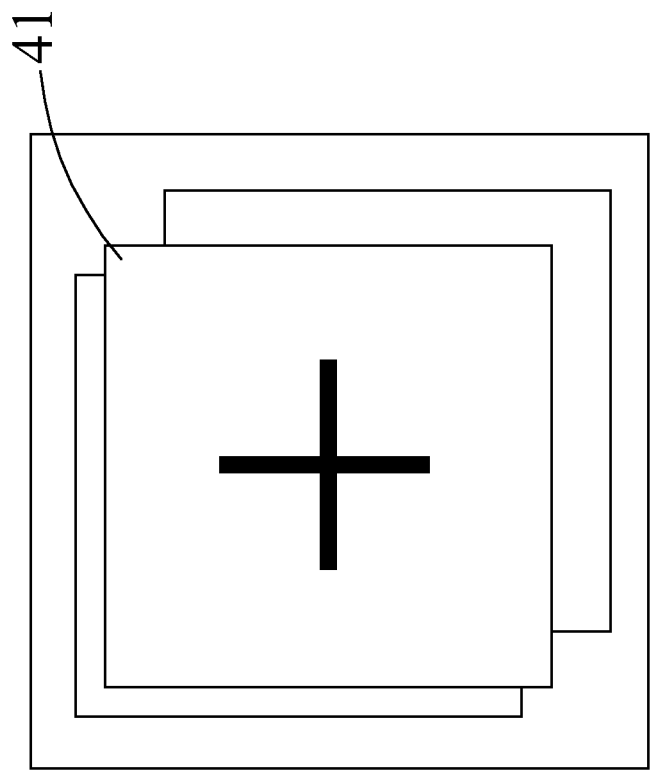
FIG. 4 is a schematic view illustrating the overlay of temporary images captured by the image capturing device in an embodiment of this invention.

Refer to FIG. 3A and FIG. 3B shown respectively as a first schematic view of grouping temporary images in an embodiment of an image capturing device according to this invention, and as a second schematic view of grouping temporary images in an embodiment of an image capturing device according to this invention. As shown in the figure, according to the magnitude of each of the weight measurement values, for example, the weight from large value to small value respectively indicating a quality ranging from high score to low score, the processing module 12 may delete some images of poor quality (lower score) or some blurry temporary images 31, 32, 33, and 34, such as temporary images with strips shown in FIG. 3A, and keep some temporary images of rich quality (higher score), such as the rests of temporary images shown in FIG. 3B. Alternatively, according to the magnitude of each of the weight measurement values, for example, the weight from large value to small value respectively indicating a quality ranging from high score to low score, the processing module 12 may give a lower weight to some images of poor quality (lower score) or some blurry temporary images 31, 32, 33, and 34, such as temporary images with strips shown in FIG. 3A, and give a higher weight to some temporary images of rich quality (higher score), such as temporary images without strips shown in FIG. 3B. In the embodiment, the weight ranging from large measurement value to small measurement value indicates the image quality ranging from high score to low score. However, the embodiments are only examples without limit to this invention; when being actually implemented, this invention is not limited to such a manner.

Refer to FIG. 4 as a schematic view illustrating the overlay of temporary images captured by the image capturing device 5 in an embodiment of this invention. As shown in the figure, the processing module 12 may further control the image integration module 14 to select a reference temporary image 41 from the temporary images of better quality and integrates the images all pixels of the same image object to generate a temporary overlay image. Besides, during overlay of the temporary images, it is solved when a temporary cannot be properly integrated with the reference temporary image 41, namely a condition in which a geometric conversion parameter between the temporary image and the selected reference temporary image 41 is measured. When no effective overlay caused by an extreme error or by the high variation of a local object in the temporary image that brings the extreme error between the temporary image and the reference temporary image 41 happens, the processing module 12 may combine the temporary images that may be properly integrated, and may remove the temporary images that cannot be integrated.

It is nevertheless especially noted that each of the modules may continuously work for the image capturing and coming image overlay, and until receiving a stop signal, the processing module 12 controls the image capturing module 10 to stop capturing the temporary image. In the embodiment, the stop signal may be generated when the following conditions exist. For example, when the total sampling time in which the processing module 12 integrates the plurality of temporary images 101 of better quality is larger than or equal to the initial exposure time, such as 1 second taken above for example, given by the exposure module 11, the processing module 12 generates the stop signal. Alternatively, when the image quality of a temporary integrated image generated when the processing module 12 integrates the plurality of temporary images exceeds a preset value, the processing module 12 generates the stop signal, in which the preset value may be set for extremely excellent quality, excellent quality, ordinary quality or the like of a final image that will be integrated before the user starts to capture an image. Alternatively, after the user press the image capturing button, the processing module 12 may continue controlling each of the modules, and until receiving a trigger signal generated when the user loosens the image capturing button, the module 12 generates the stop signal.

Next, the processing module 12 may control the image integration module 14 to finish the overlay of temporary images, a final storage image 151 being thereby generated and stored in the storage module 15. The processing module 12 may control the display module 16 for showing the storage image 151. By the way, it is apparent to those who are skilled in the art that the embodiments describing the stop signal generation are only examples without limit to this invention.

From the description made above, thanks to such a degree of freedom, the frame quality may be dynamically increased after overlay. Before the image capturing device 1 determines to finish the image capturing of the final storage frame, the quality of captured frame may be kept and improved with coming helpful information. In other words, in the method of dynamically adjusting the sampling length according to the frame quality, the quality of final storage image is effectively increased.

Figure 5:
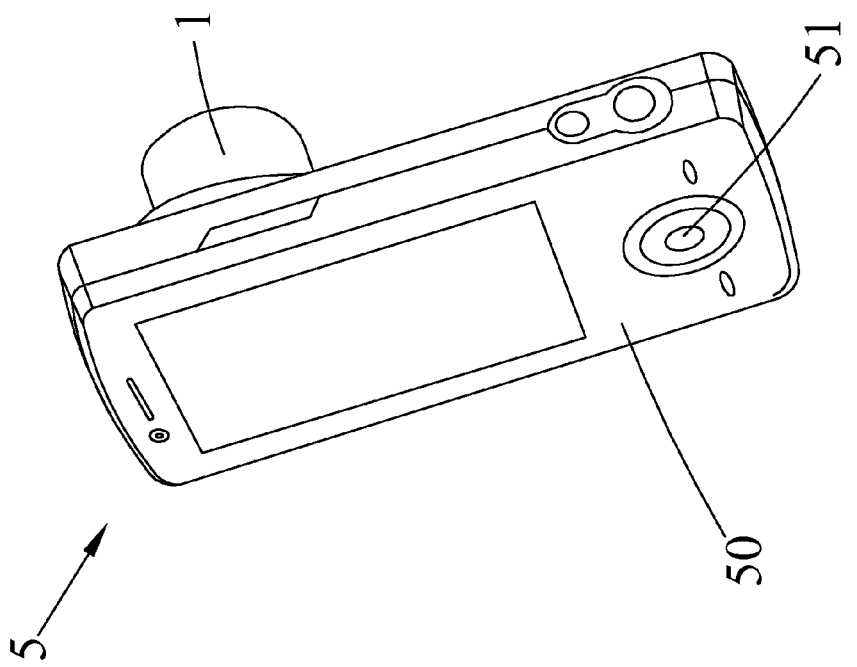
FIG. 5 is a schematic view illustrating an electronic device provided with an image capturing function in an embodiment of this invention.

Refer to FIG. 5 as a schematic view illustrating an embodiment of an electronic device with the image capturing function according to this invention. As shown in the figure, the electronic device 5 according to this invention comprises a body 50, an input means 51, and the image capturing device 1. The image capturing device 1 is provided on the body 50 and is electrically connected to the input means 51. The image capturing device 1 comprises the image capturing module, the exposure module, the processing module, the image analysis module, the image integration module, the storage module, and the display module. The image capturing device 1 is described in detail above, so unnecessary details are not given here. It is nevertheless especially noted that the electronic device 5 according to this invention may be a mobile handheld device, such as a digital camera, a multimedia playback device with a camera function, a camera mobile phone, a smart phone, a navigator, a camera tablet PC or PDA and the like.

In the embodiment, the electronic device 5 according to this invention provided, for example, in a smart phone, may be embedded into the image capturing device 1 according to this invention to function as a camera. Thus, the user may use the input means 51 of smart phone, such as a touch panel or a hardware button, to make the electronic device 5 immediately analyze the temporary images, dynamically adjust the temporary image sampling time, and select and combine the temporary images of better quality in the condition of capturing of multiple images for image overlay, which significantly increases the quality of integrated images. The smart phone disclosed in this invention is an only example without limit to this invention; those who are skilled in the art may easily replace the device with another device for operating with the image capturing device according to this invention.

Although the image capturing device according to this invention is described above and the method of capturing the images captured by the device is described, for the details, a flow chart is described in detail below.

Figure 6:
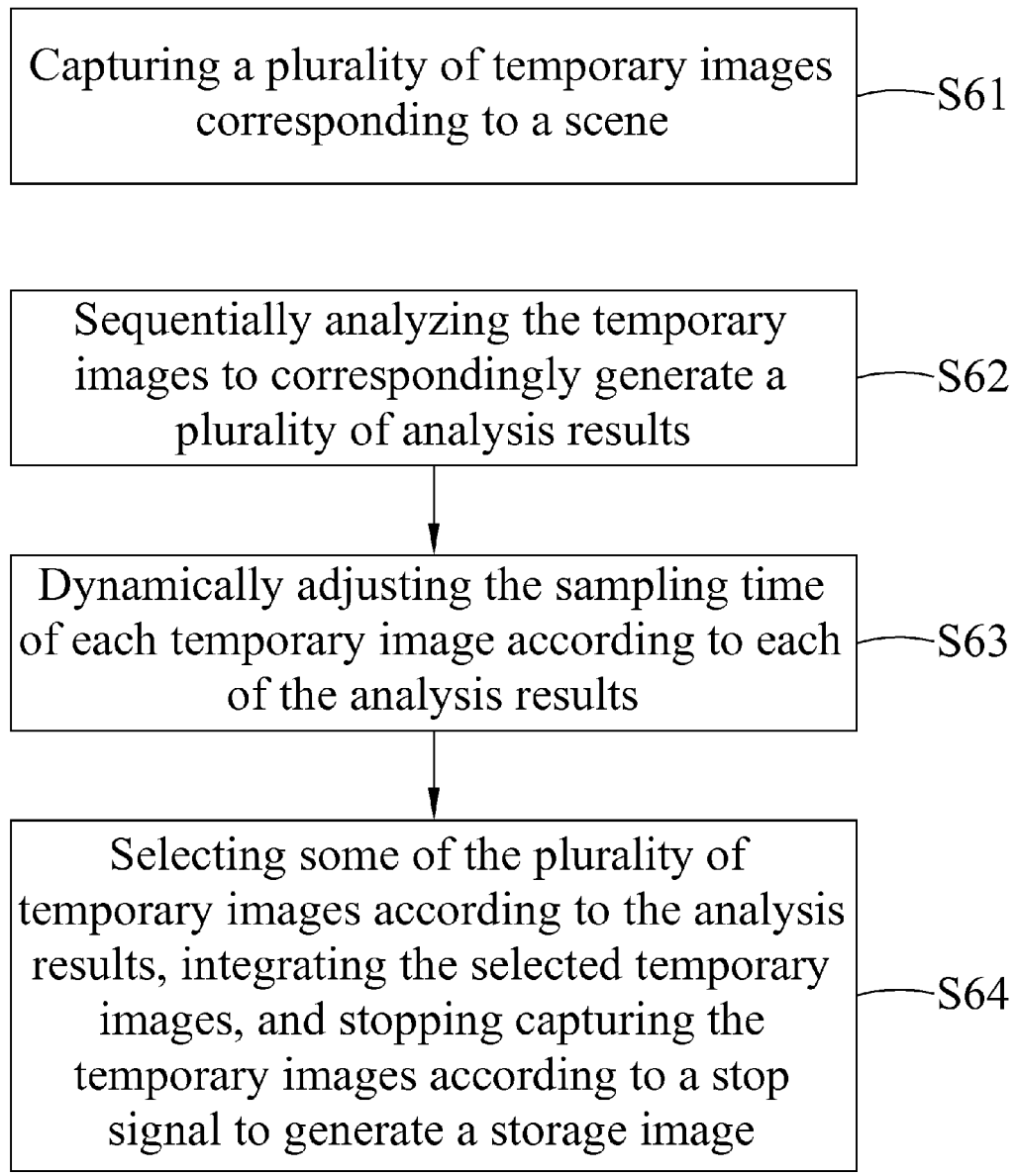
FIG. 6 is a flow chart of an image capturing method according to this invention.

Refer to FIG. 6 as a flow chart of an image capturing method according to this invention. As show in the chart, the image capturing method according to this invention is applied to the image capturing device. The image capturing device 1 comprises an image capturing module, an exposure module, a processing module, an image analysis module, an image integration module, a storage module, and a display module. The method of capturing the images captured by the image capturing device comprises the following steps:

(S61) capturing a plurality of temporary images corresponding to a scene by an image capturing module;

(S62) controlling an image analysis module to analyze a motion blur or sampling quantization error of each of the temporary images for correspondingly generating the analysis results by the processing module;

(S63) dynamically adjusting the sampling time of each temporary image captured by the image capturing module according to each of the analysis results by the processing module; and (S64) selecting some of the plurality of temporary images according to the analysis results, integrating the selected temporary images, and stopping capturing the temporary images according to a stop signal to generate a storage image by the processing module.

The detailed description and embodiments of image capturing method for the image capturing device according to this invention are given above, and so unnecessary details are not given here.

To sum up, during capturing, with the image capturing device and image capturing method thereof, by means of the characteristics of a high-speed sensor, according to the quality of a previous temporary image, a following temporary image is dynamically adjusted and an adequate temporary image is selected and unnecessary temporary image is removed to determine a required temporary images for image overlay, and a total exposure time is not limited in advance for capturing temporary images required for overlay. Thus, the effect of image synthesis is improved.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An image capturing device, comprising:
an image capturing module capturing a plurality of temporary images corresponding to a scene; and
a processing module sequentially analyzing the temporary images by controlling an image analysis module to analyze a motion blur or sampling quantization error of each of the temporary images to correspondingly generate a plurality of analysis results, dynamically and sequentially adjusting sampling time of each temporary image captured by the image capturing module according to each of the analysis results, selecting some of the plurality of temporary images according to the analysis results, integrating the selected temporary images, and stopping capturing the temporary images based upon a stop signal to generate a storage image;
wherein each of the analysis results is generated on one of the temporary images and is a weight measurement value of the one of the temporary images, the processing module dynamically adjusts the sampling time of the latter one temporary image according to the weight measurement value of the one of the temporary images and selects and integrates the temporary images according to the weight measurement value utilized in adjusting the sampling time of the latter one temporary image of the one of the temporary images;
wherein the sampling time of the latter one temporary image in each of temporary images is reduced when the motion blur and sampling measurement error of the previous one of the temporary image in each of temporary images is not in a predetermined range, and the sampling time of the latter one temporary image in each of temporary images is lengthen when the motion blur or sampling measurement error of the previous one of the temporary image in each of temporary images is in the predetermined range.

2. The image capturing device according to claim 1, wherein the processing module determines the sampling time, determines whether the temporary image is used for image overlay, or determines a weight of temporary image used for image overlay according to the analysis result.

3. The image capturing device according to claim 1, further comprising an exposure module metering the light of scene to generate an exposure time, wherein the processing module determines the sampling time of a first temporary image of the plurality of temporary images according to the exposure time.

4. The image capturing device according to claim 3, wherein the processing module generates the stop signal when the total sampling time in which the processing module integrates the plurality of temporary images is larger than or equal to the exposure time.

5. The image capturing device according to claim 1, wherein the processing module generates the stop signal when the image quality of a temporary integrated image generated when the processing module integrates the plurality of temporary images exceeds a preset value.

6. The image capturing device according to claim 1, wherein the processing module generates the stop signal when receiving a trigger signal.

7. An image capturing device, comprising:
means for capturing a plurality of temporary images corresponding to a scene; and
means for sequentially analyzing the temporary images by means for analyzing a motion blur or sampling quantization error of each of the temporary images to correspondingly generate a plurality of analysis results;
means for determining the sampling time, or whether the temporary image is used for image overlay, or a weight of temporary image used for image overlay according to the analysis result;
means for dynamically and sequentially adjusting sampling time of each temporary image captured by the image capturing module according to each of the analysis results;
means for selecting some of the plurality of temporary images according to the analysis results, and integrating the selected temporary images; and
means for stopping capturing the temporary images based upon a stop signal to generate a storage image;
wherein each of the analysis results is generated on one of the temporary images and is a weight measurement value of the one of the temporary images, the sampling time of the latter one temporary image is dynamically adjusted according to the weight measurement value of the one of the temporary images and the temporary images is selected and integrated according to the weight measurement value, which is utilized in adjusting the sampling time of the latter one temporary image, thereof;
wherein the sampling time of the latter one temporary image in each of temporary images is reduced when the motion blur and sampling measurement error of the previous one of the temporary image in each of temporary images is not in a predetermined range, and the sampling time of the latter one temporary image in each of temporary images is lengthen when the motion blur or sampling measurement error of the previous one of the temporary image in each of temporary images is in the predetermined range.

8. The image capturing device according to claim 7, further comprising means for metering the light of scene to generate an exposure time and determining the sampling time of a first temporary image of the plurality of temporary images according to the exposure time.

9. The image capturing device according to claim 8, further comprising means for generating the stop signal when the total sampling time in which the plurality of temporary images are integrated is larger than or equal to the exposure time.

10. The image capturing device according to claim 7, further comprising means for generating the stop signal when the image quality of a temporary integrated image generated when the plurality of temporary images are integrated exceeds a preset value.

11. The image capturing device according to claim 7, further comprising means for generating the stop signal upon receipt of a trigger signal.

12. An image capturing method, comprising the following steps:
capturing a plurality of temporary images corresponding to a scene by an image capturing module;

sequentially analyzing the temporary images by a processing module to control an image analysis module to analyze a motion blur or sampling quantization error of each of the temporary images to correspondingly generate a plurality of analysis results, each of which is generated on one of the temporary images and is a weight measurement value of the one of the temporary images;

dynamically and sequentially adjusting sampling time of each temporary image, which is captured by the image capturing module, according to the weight measurement value of the previous one of the temporary image by the processing module; and selecting and integrating some of the plurality of temporary images according to the weight measurement value, which is utilized in adjusting the sampling time of the latter one temporary image, thereof, and stopping capturing the temporary images according to a stop signal to generate a storage image by the processing module;

wherein the sampling time of the latter one temporary image in each of temporary images is reduced when the motion blur and sampling measurement error of the previous one of the temporary image in each of temporary images is not in a predetermined range, and the sampling time of the latter one temporary image in each of temporary images is lengthen when the motion blur or sampling measurement error of the previous one of the temporary image in each of temporary images is in the predetermined range.

13. The image capturing method according to claim 12, further comprising the following step:
metering the light of scene to generate an exposure time by an exposure module; and
determining the sampling time of a first temporary image of the plurality of temporary images according to the exposure time by the processing module.

14. The image capturing method according to claim 13, further comprising the following step:
generating the stop signal by the processing module when the total sampling time in which the processing module integrates the plurality of temporary images is larger than or equal to the exposure time.

15. The image capturing method according to claim 12, further comprising the following step:
generating the stop signal by the processing module when the image quality of a temporary integrated image generated when the processing module integrates the plurality of temporary images exceeds a preset value.

* * * * *